United States Patent
Holberg

(10) Patent No.: US 8,028,905 B2
(45) Date of Patent: Oct. 4, 2011

(54) SYSTEM AND METHOD FOR TRACKING INDIVIDUALS VIA REMOTE TRANSMITTERS ATTACHED TO PERSONAL ITEMS

(76) Inventor: Jordan R. Holberg, New York, NY (US)

( * ) Notice: Subject to any disclaimer, the term of this patent is extended or adjusted under 35 U.S.C. 154(b) by 662 days.

(21) Appl. No.: 12/152,961

(22) Filed: May 19, 2008

(65) Prior Publication Data

US 2008/0302867 A1    Dec. 11, 2008

Related U.S. Application Data

(60) Provisional application No. 60/938,905, filed on May 18, 2007.

(51) Int. Cl.
*G06K 15/00* (2006.01)
(52) U.S. Cl. ...................................................... 235/383
(58) Field of Classification Search .................. 235/375, 235/382, 383, 385, 472.01–472.03, 492
See application file for complete search history.

(56) References Cited

U.S. PATENT DOCUMENTS

| | | | | |
|---|---|---|---|---|
| 6,912,398 | B1 * | 6/2005 | Domnitz | 455/461 |
| 7,298,271 | B2 * | 11/2007 | Sprogis | 340/572.1 |
| 7,475,813 | B2 * | 1/2009 | Swanson, Sr. | 235/383 |
| 2008/0000959 | A1 * | 1/2008 | Faoro et al. | 235/375 |

OTHER PUBLICATIONS

Marshall Kirkpatrick, MingleNow to make top users VIPs in real life, http://techcrunch.com/2006/09/05/minglenow-to-make-top-users-vips-in-real-life/, Sep. 5, 2006.
http://techcrunch.com/about-techcrunch/ Jun. 11, 2005.
http://crunchbase.com/company/tetherball 2008.
http://crunchbase.com/company/yelp Jul. 2004.
http://crunchbase.com/product/fireeagle Mar. 5, 2008.
http://crunchbase.com/company/loopt Jan. 2005.
http://brightkite.com/pages/bk_about.html Oct. 2005.
http://crunchbase.com/company/brightkite Aug. 2007.
http://www.crunchbase.com/company/gowalla; Aug. 2007.
http://www.crunchbase.com/product/gowalla Mar. 2009.
Tech Feed: Location-based craze—is it safe?, http://www.fsu.ca/story.asp?ibangYear=1011&storyID=208§ion ID=3&issueID=7, Oct. 4, 2010.
http://www.about.loopt.com/ 2005.
http://www.mashable.com/2006/10/30/minglenow-launches-myspace-for-events-and-nightlife/ Oct. 30, 2006.

* cited by examiner

Primary Examiner — Seung H Lee
(74) Attorney, Agent, or Firm — Ostrolenk Faber LLP

(57) ABSTRACT

In accordance with an embodiment, a system and method for verifying presence at a vendor location is defined. Preferably, an identification tag is coupled to a device, and the identification tag is operable to transmit a unique user identifier representing the user in possession of the device. The identification tag preferably includes a low frequency RFID device. Further, an identification tag reader is provided that is operable to receive from the identification tag the user identifier. The identification tag reader is preferably placed at a location of a vendor. Further, a computing device is provided that is operable to receive the user identifier from the identification tag reader. The computing device is further operable to receive from the identification tag reader a vendor identifier representing the vendor location, and is still further operable to receive a time identifier representing a time when the identification tag reader received the user identifier from the identification tag. Preferably, a database is also provided that stores the user identifier, the vendor identifier and the time identifiers with a plurality of other user identifiers, other vendor identifiers and other time identifiers. The computing device determines the name of the user and the name of the vendor as a function of the user identifier and the vendor identifier.

21 Claims, 7 Drawing Sheets

SYSTEM AND METHOD FOR TRACKING INDIVIDUALS VIA REMOTE TRANSMITTERS ATTACHED TO PERSONAL ITEMS

CROSS-REFERENCE TO RELATED APPLICATION

This application is based on and claims priority to U.S. Provisional Patent Application Ser. No. 60/938,905, filed on May 18, 2007 and entitled SYSTEM AND METHOD FOR TRACKING INDIVIDUALS VIA REMOTE TRANSMITTERS ATTACHED TO PERSONAL ITEMS, the entire contents of which are hereby incorporated by reference.

BACKGROUND

1. Field of the Invention

The present invention relates generally to communications, and, more particularly, to integrating remote hardware and software in a social networking application and a direct-to-consumer marketing application.

2. Description of the Related Art

Interpersonal communication has dramatically improved over the past decades, largely due to technological advances in cellular telephone technology, and the internet. Although mechanisms for people to communicate are known and available, vendors and consumers, as well as people in purely social contexts, continue to strive for improved access to each other.

In one example, a vendor with a business desires to advertise on a social network. Examples of social network internet web sites include www.myspace.com and www.facebook.com, which typically allow an end-user to create a personal profile to be shared within the confines of the respective web site. Social networks typically facilitate private messaging between users, sharing of media such as photos, blogs or videos, personal interests of an end-user and comments or feedback on other end-user's content. Social networks may also function as a social calendar. In the prior art, the vendor, typically, was charged a significant amount of money to be represented as a normal "end-user," and, in exchange, the vendor has access to "friends" for sending marketing-related messages. The vendor, typically can post pictures, comments, videos and bulletins and interact with other end-users, and even pose or otherwise be represented as a non-vendor end-user. Additionally, the vendor may be provided with options to collaborate with the social network, such as to run banner advertisement campaigns across the social network to reach a target demographic. The social network typically segments end-users most likely to be influenced by such banner advertisements, based on information those end-users have provided.

While it is possible that end-users supply erroneous information that may not accurately represent respective the end-users' social class, status, locations or interests, known social networks do try to reach target demographics accurately so that end-users are enticed to select banner advertisements and purchase respective products or services. Prior art social networks make a great deal of money from pseudo-end-user avatars, as known in the art, and may also charge vendors per end-user click on the vendor's banner advertisements. A pseudo-end-user avatar is any vendor that assumes an identity on the social network, but is backed by an organization or company as opposed to a single person, and functions in exactly the same way as a normal end-user. Prior art social networks also attempt to mine end-user demographic data to provide the most relevant and potential customers for vendors.

In another example, a vendor at a trade show desires to collect contact information. The vendor has a booth to sell his goods/services, and to present promotional signs and displays. In case a potential client or someone of interest walks by the vendor's booth and is interested in what the vendor is offering, the vendor speaks to the person directly, or hands the person a brochure or other marketing materials. In order for the vendor and the person to remain in contact in the future and away from the trade show, contact information of the vendor and/or person must be exchanged to allow the parties to communicate.

In yet another example, a vendor desires to provide relevant information to end-users. The vendor wants to advertise to existing and potential end-users in several different ways. Combined with typical known market research, the vendor can communicate in various ways, such as by direct mail, e-mails, as well as with other non-traditional marketing messages, such as short message service ("SMS") and online banner-advertisements. However, the vendor must rely on prior experiences to guide choices about where and when to place such advertisements and may feel required to enlist the help of third parties to analyze customers and make recommendations for the best strategy to reach a particular demographic. The vendor may feel inclined to cull an end-user list for example, for a direct mail or SMS campaign from various sources and hope that the end-users are still interested in the vendor's products or services. Active and constant collection and tracking of user-provided data allows for more relevant and timely messages to the end-user.

In still another prior art example, a vendor wants to target end-users for additional sales during a point of sale, as known in the art. In the prior art, the vendor strategically places a sign or employs knowledgeable and charismatic salespeople with an ability to promote the vendor's campaign. This option is, typically, not available to most vendors. Occasionally a venue, such as a large stadium, however may provide a similar option, such as to promote some campaign, such as a "lucky seat" that entitles one or more customers to win something.

Another prior art example regards end-user communication, in which end-users desire to communicate with each other. In the prior art, the end-user can use a telephone, which may be impractical for contacting many people. Another option for the user is to read blogs or visit web sites to check whether plans or events are posted. Yet another option is for the end-user physically to visit places where friends might be present.

In yet another prior art example, an end-user desires to locate people having similar interests. Known choices that are available to the end-user include reading people's profiles on a social network, but the information posted thereon may be obsolete or wrong. Moreover, information may be poorly organized or otherwise difficult to locate. Another alternative includes physically meeting people in real-world places, or the user can join a club in the real-world or virtual group of other end-users and hope to find people having similar interests.

In yet another prior art example, an end-user wants to publish to his friends that he just attended an event, such as an exclusive concert or play. In the prior art, the end-user can call, write, or post about the shown on the internet to share the experience with friends and family. Unfortunately, the story of the end-user's experience must be taken at face value, though the end-user can back up claims with pictures or verification from other people who can confirm the user was present.

Thus and as described above, although mechanisms and devices are available for communication in the prior art, problems and shortcomings still persist that impede people from communicating with each other.

SUMMARY

An improved system and method is provided for interpersonal communications that are secure, immediate and far-reaching. In accordance with an embodiment, a system and method for verifying presence at a vendor location is defined. Preferably, an identification tag is coupled to a device, and the identification tag is operable to transmit a unique user identifier representing the user in possession of the device. The identification tag preferably includes a low frequency RFID device. Further, an identification tag reader is provided that is operable to receive from the identification tag the user identifier. The identification tag reader is preferably placed at a location of a vendor. Further, a computing device is provided that is operable to receive the user identifier from the identification tag reader. The computing device is further operable to receive from the identification tag reader a vendor identifier representing the vendor location, and is still further operable to receive a time identifier representing a time when the identification tag reader received the user identifier from the identification tag. Preferably, a database is also provided that stores the user identifier, the vendor identifier and the time identifiers with a plurality of other user identifiers, other vendor identifiers and other time identifiers. The computing device determines the name of the user and the name of the vendor as a function of the user identifier and the vendor identifier.

In another embodiment, a promotion is provided to the user from the vendor as a function of the identification tag reader receiving the user identifier. In yet another embodiment, the promotion includes an advertisement transmitted to the device. In still another embodiment, the promotion includes a price discount on a good or service provided by the vendor.

Other embodiments are disclosed herein. For example, a vendor avatar representing the vendor is preferably displayed on an internet site and/or a user avatar representing the user is displayed on the internet web site. In another embodiment, an advertisement campaign is transmitted to a plurality of users as a function of user identifiers and time identifiers. The computing device may post the name of the user (or an alias name of the user), the name of the vendor and/or the time when the tag reader received the data from the identification tag on an internet web site. Further, the computing device may provide access to at least one of the name of the user or the alias name, the name of the vendor, and the time identifier to visitors of the internet web site pursuant to privacy settings defined by the user.

In another embodiment, a method is defined for verifying a person's presence at a particular location. The method includes storing in a database user information of people, wherein each of the people has a respective identification tag. A tag reader receives data from one of the respective identification tags, and the data are transmitted from the tag reader to a computing device. Preferably, an event ID is determined that represents an event where the tag reader received the data. Further, a user ID representing a user of the one respective identification tag is determined or, alternatively, a new user ID is assigned in case the user ID cannot be determined from the data. Further, a time stamp when the tag reader received the data is determined. The user ID is preferably matched matching the user ID with information in the database, storing the event ID, the user ID and the time stamp to be published on an internet web site in case the matched data indicates that the user associated with the user ID has authorized the publishing.

Other features and advantages of the present invention will become apparent from the following description of the invention that refers to the accompanying drawings.

BRIEF DESCRIPTION OF THE DRAWINGS

For the purposes of illustrating the invention, there is shown in the drawings a form which is presently preferred, it being understood, however, that the invention is not limited to the precise arrangements and instrumentalities shown, in which.

DESCRIPTION OF THE EMBODIMENTS

Figure 1:
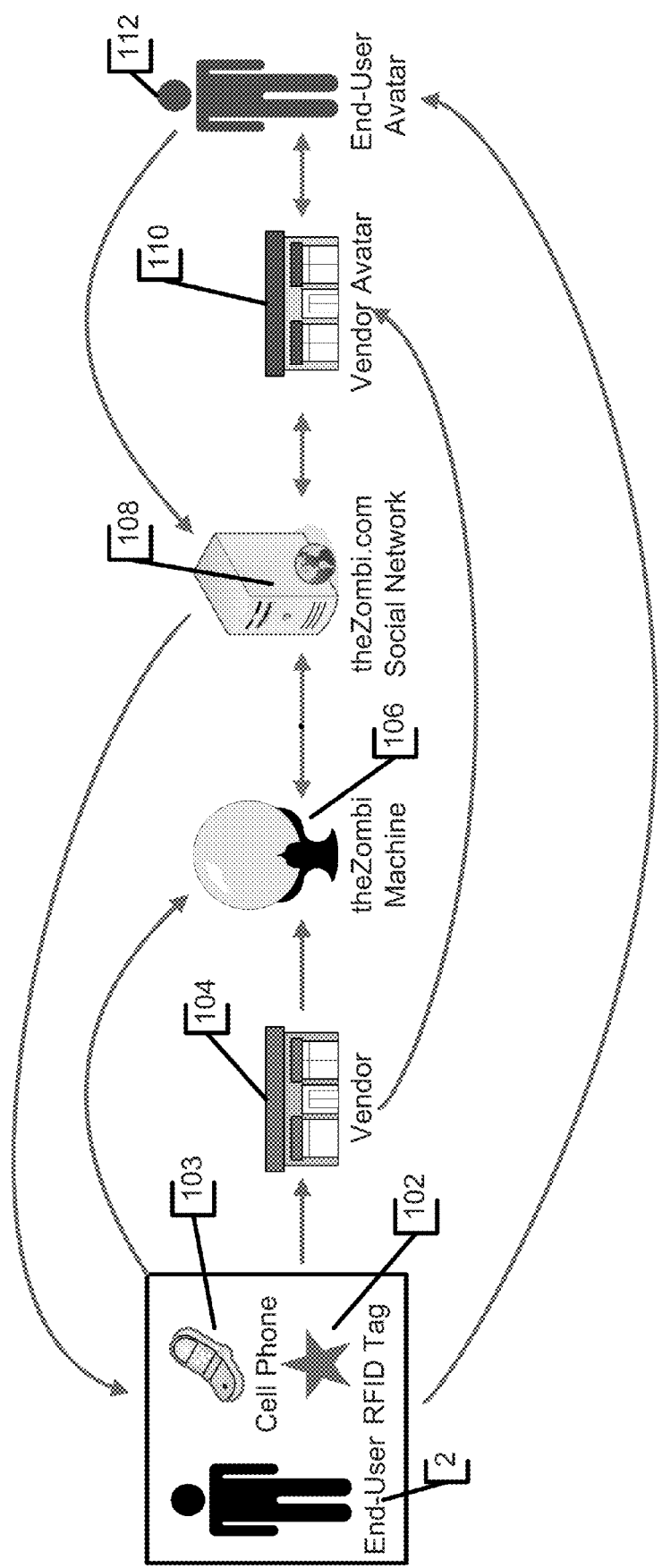
FIG. 1 illustrates an example hardware and end-user layout associated with a preferred embodiment.

In preferred embodiments disclosed herein, a reading device, such as the RFID Reader is provided with a cellular modem or other transmitting device and enables wireless transmission of data, such as a radio frequency identification ("RFID"), tag is provided and transmits a unique identifier to a computing device, such as a server computer over a communication network. The identifier preferably is used to identifier a person in possession of the device and verifies the person's location at a given time.

In a preferred embodiment, a social community is defined and/or supported by the systems and methods described herein. One way a social community is supported is via an internet web site that members and/or the general public access to determine the past or present whereabouts of members of the community. In one embodiment, the web site is secured to protect users' privacy, and further is operable to respond to various events that occur over time. Examples of an event is a purchase by a user of a good or service, an RFID Tag being read by an RFID Reader, or graphical screen control selections made by users on web pages associated with the web site. In one embodiment, vendors of goods and/or services define events (such as purchasing a good) that cause the web site to respond, such as by sending messages to users upon occurrence of the event. The events and/or responses to events are preferably defined to occur once or, alternatively, on recurring bases.

Accordingly, advantages provided by of the teachings herein relate to real-world activity, including related to vendor-based portals or related web sites, and a social network that does not require affiliation with, for example, a religion, private club or other exclusive, closed-knit community of members that preclude easy access thereto.

Moreover, the systems and methods disclosed herein provide new marketing opportunities for vendors of goods and services, as well. For example, by tracking the various locations consumers visit and the respective times thereof, vendors can target consumers with specific advertising campaigns that have a high degree of relevance and likelihood of sales. Using the systems and methods disclosed herein, particularly related to specific times and places that consumers frequent, vendors can educate particular segments of consumers to products and services the those consumers would have otherwise not been exposed to.

In one embodiment, data, such as RFID Tag unique identifier, are transmitted each time an RFID Tag is read. Alternatively, a plurality of RFID Tags are read by a RFID Reader, and the plurality of RFID Tag unique identifiers are transmitted by batch to the secure server.

In accordance with the forthcoming description, the following terms are used and refer, generally, as set forth:

THEZOMBIMACHINE: A combination of hardware and software that wirelessly receives and transmits an RFID Tag unique identifier, as well as a timestamp and location, and also includes an RFID reader, a wireless modem, functional circuitry and an assembly enclosure.

RFID: Radio Frequency Identification, a known and used technology, often employed in various so-called "vertical" applications, such as in connection with security devices placed at store or other building exits, or distributed in connection with goods sold in retail establishments (e.g., Wal-Mart, K-Mart, or the like).

RFID tag: A tiny microchip and antenna combination that can be formed and provided with an extremely small and thin sticker. Each RFID tag preferably includes a unique identifier that can be transmitted to an RFID Reader.

Unique identifier: A unique number stored inside an RFID tag that is not alterable.

RFID reader: A device that is operable to read an RFID tag, including the RFID tag's unique identifier. An RFID reader is preferably a wireless device, as known in the art, and is reads an RFID tag when the tag is within a predetermined ("read") range of the RFID reader.

Location: A physical location where an RFID reader is positioned.

Timestamp: Date and time when an event, such as an RFID tag being read by an RFID reader, occurs.

SMS: Short Message Services, such as provided in cellular text messages.

Participating Vendors: Any entity that employs the use of THEZOMBIMACHINE, the accompanying social network and/or associated marketing techniques Participating Users: Any entity that employs the use of an RFID tag to interact with a participating vendor.

In accordance with an example hardware arrangement in an embodiment, one or more information processor(s) preferably include or have access to databases necessary to support the teachings herein. It is contemplated that any information processor can access any required database via a communication network to which the information processor may be coupled. The communication network is preferably a global public communication network such as the Internet, but can also be a wide area network (WAN), local area network (LAN), an intranet or other network that enables computing devices and peripheral devices to communicate.

In a preferred embodiment, the information processor(s) are any computer readable medium devices that are capable of sending and receiving data across the communication network, e.g., mainframe computers, mini computers, personal computers, laptop computers, a personal digital assistants (PDA), cellular telephones and Internet access devices such as Web TV. In addition, information processors are preferably equipped with web browser software, such as MICROSOFT INTERNET EXPLORER, MOZILLA FIREFOX, or the like. Information processors are coupled to the communication network using any known data communication networking technology.

Functional elements of an example information processor include one or more central processing units (CPU) that are used to execute software code and control the operation of the information processor. Other elements include read-only memory (ROM), random access memory (RAM), one or more network interfaces to transmit and receive data to and from other computing devices across a communication network, storage devices such as a hard disk drive, floppy disk drive, tape drive, CD ROM or DVD for storing program code databases and application data, one or more input devices, such as a keyboard, mouse, track ball, microphone and the like, and a display.

Moreover, the various components of an information processor need not be physically contained within the same chassis or even located in a single location. For example, a storage device may be located at a site which is remote from the remaining elements of an information processor, and may even be connected to a CPU across a communication network via a network interface. The Information processor(s) preferably includes a memory equipped with sufficient storage to provide the necessary databases, forums, and other community services as well as acting as a web server for communicating hypertext markup language (HTML), Java applets, Active-X control programs. The information processors are preferably arranged with components that are suitable for expected operating environment of information processor. The CPU(s), network interface(s) and memory and storage devices are selected to ensure that capacities are arranged to accommodate expected demand.

The nature of the invention is such that one skilled in the art of writing computer executable code (i.e., software) can implement the functions described herein using one or more of a combination of popular computer programming languages and developing environments including, but not limited to, C, C++, Visual Basic, JAVA, HTML, XML, ACTIVE SERVER PAGES, JAVA server pages, servlets, MYSQL and PHP.

Although the present invention is described by way of example herein and in terms of a web-based system using web browsers and a web site server (e.g., an information processor), the invention is not limited to such a configuration. It is contemplated that hardware can be arranged data are communicated using any known communication method, for example, using a non-Internet browser WINDOWS viewer coupled with a local area network protocol such as the Internet Packet Exchange (IPX), dial-up, third-party, private network or a value added network (VAN).

It is further contemplated that any suitable operating system can be used on an information processor, for example, DOS, WINDOWS 3.x, WINDOWS 95, WINDOWS 98, WINDOWS NT, WINDOWS 2000, WINDOWS ME, WINDOWS CE, WINDOWS POCKET PC, WINDOWS XP, MAC OS, UNIX, LINUX, PALM OS, POCKET PC and any other suitable operating system.

RFID tags are relatively inexpensive to manufacture and can be provided in very small applications, such as in stickers that can be placed on the back of personal devices, such as cellular telephones, personal digital assistants ("PDAs"), personal music player devices or the like. In a preferred embodiment, a sticker containing the RFID tag is sufficiently sized as not to interfere with the user's enjoyment of the respective device to which the sticker containing the RFID tag is attached. Although many examples herein describe the RFID Tag attached to a device, such as a cellular telephone, the RFID Tag can be attached to any desirable surface, including, for example, credit cards, ID cards, books, or the like.

As known in the art, RFID tags and RFID readers typically operate within a range of one or more radio frequencies. RFID-related applications often use one or more specific frequencies to ensure optimal performance. Moreover, the distance between an RFID tag and an RFID reader may vary from a few centimeters to several dozen kilometers, depending, for example, upon the respective frequency of the RFID tag and/or RFID reader, as well as the particular configuration of the RFID tag and/or RFID reader. Passive RFID tags, for example, typically do not require a power source and transmit data when the RFID tag is in a predetermined range with an RFID reader and tuned to transmit at the RFID reader's specific frequency. In a preferred embodiment, the privacy of a user is considered such that RFID tags applied to users' personal devices are readable by RFID readers when the RFID tag is positioned within a few inches of an RFID reader. Thus in a preferred embodiment, a passive RFID tag is provided.

In a preferred embodiment, an RFID Tag is provided to transmit only a unique identifier. No personal or otherwise personally identifiable information of the end-user is stored on the RFID Tag or transmitted from the RFID Tag. Moreover, the sticker or other carrier for the RFID Tags is printable in full color, and can be formatted with sufficient space for branding and marketing messages. Unique identifiers and corresponding information, such as personally identifiable information of an end-user, are preferably stored in a database, thereby enabling one RFID Tag to be substituted with another RFID Tag. The database storing unique identifiers and corresponding information, for example, representing a user, is updated accordingly. Thus, for example, in case an RFID Tag fails, the user can substitute the failed RFID Tag with a replacement RFID Tag, and the database preferably is updated accordingly.

In a preferred embodiment, the RFID Reader is provided with a cellular modem or other transmitting device and enables wireless transmission of data, such as an RFID Tag unique identifier, to a secure server. Of course one skilled in the art will recognize that the present invention is not limited to wireless transmissions, and that other embodiments are envisioned herein that include, for example, transmissions provided via Ethernet, such as via a docking station or other wired interface.

In one embodiment, data, such as RFID Tag unique identifier, are transmitted each time an RFID Tag is read. Alternatively, a plurality of RFID Tags are read by the RFID Reader, and a batch of RFID Tag unique identifiers are transmitted to the secure server. Preferably, the batch of RFID Tags identifiers is sequentially transmitted to the server.

The RFID Reader is preferably configured to be small such as the size of five inches by five inches by one inch and operates using a typical household electrical outlet to operate properly. Alternatively, the size of the Reader may vary and the Reader may be provided in many forms. For example, the Reader may be contained in a non-traditional enclosure, such as a basketball or a doormat. No customized settings or proprietary configuration options are preferably required to operate the RFID Reader.

In one embodiment, the unique identifier is correlated or "bound" to a user's cellular telephone number. In this embodiment, the correlation is maintained or occurs via the database. Preferably, the user's cellular telephone number or other information, including personally identifiable information, is not transmitted from the RFID Tag. In this embodiment, a user can elect to receive marketing-related messages or other information, for example, during a point of sale transaction and substantially in real-time from a vendor. Alternatively, the user may receive marketing-related or other information in the future as a function of a point-of-sale transaction. The information may be provided to the user via an SMS session, and is initiated, for example, when the user places his device to which an RFID Tag is coupled within reading distance of an RFID reader. The act of "swiping" in activates an SMS session, and indicates the user has brought the RFID tag in proximity to the RFID reader.

The RFID Reader is preferably configured with a plurality of elements, including an RFID reception element, an antenna, a transmission element, such as a cellular modem, and a cellular antenna. Moreover, the RFID Reader is configured with a subscriber identity module ("SIM"), as known in the art. Further, the RFID Reader is configured with user feedback elements, such as light emitting diodes ("LEDs") and/or speakers.

In addition, a basic wireless device (shown in the accompanying drawings and referred to herein as "THEZOMBI MACHINE") is provided that integrates a low frequency ("LF"), passive RFID Reader, preferably operating at around 125 MHz and connected to a compatible LF RFID antenna. The RFID reader is physically connected to a circuit board that supports Transistor-Transistor Logic ("TTL") serial communications, as known in the art, between the output of the RFID Reader and the cellular or other modem. The cellular or other modem is preferably configured with scriptable code to allow for manipulation and parsing of data received by the RFID Reader. The modem preferably processes the information received by the RFID Reader and couples this information with a timestamp and SIM Card identifier. The data are preferably, thereafter, transmitted wirelessly via a proprietary communication protocol through the cellular antenna to a server located elsewhere. The circuit board preferably includes integrated feedback devices that allow for user feedback when the modem and/or RFID Reader successful reads and processes information provided by the end-user. For example, an audible beep or a visible flash of light indicating successful transmission is provided. The wireless device is preferably powered by either a standard A/C power source or by an internal battery.

Thus, in a preferred embodiment, communication from the RFID Tag involves low-level confirmation of end-user presence and/or successful data receipt.

As noted above, a social community is supported by the systems and methods described herein. One way the social community is supported is via an internet web site operable on an information server. The web site is preferably secured to protect users' privacy, and further is operable to respond to various events that occur over time. Examples of an event is a purchase by a user of a good or service, an RFID Tag being read by an RFID Reader, or graphical screen control selections made by users on web pages associated with the web site. In one embodiment, vendors of goods and/or services define events (such as purchasing a good) that cause the web site to respond, such as by sending messages to users upon occurrence of the event. The events and/or responses to events are preferably defined to occur once or, alternatively, on recurring bases.

In one embodiment, the internet web server of the present invention supports personal pages to be developed and used by participating end-users. In this way, users can review each other's personal web pages, thereby furthering support of the social network and community. Moreover, personal web pages can be provided for participating vendors, as well. As a user uses a device equipped with an RFID Tag in a participating vendor's location, an indication of the user's presence is immediately stored and/or displayed on a web site of the user's choice, or, alternatively, via personal RSS feed, as known in the art. The degree to which information is stored and/or displayed depends, in part, upon each user's respective authorization level and/or privacy levels defined by the user or other authorized user. By displaying a user's presence in a particular establishment, friends, family or others are alerted to the user's location or that the user patronized a respective vendor. This feature substantiates users' claims that respective vendors were patronized thereby, and also supports and enhances the social community aspect. Thus, a sort of hub is provided for discussion, pictures, comments and social interaction with other like-minded and attending or non-attending users.

In a preferred embodiment, access to the web site and participation therewith are provided free of charge and does not require the use of the RFID Tag. In an alternative embodiment, certain features are available only by limited access, such as in connection with third-party social networking internet web sites not affiliated with a proprietor of the teachings herein. Preferably, vendors use the web site to define events and/or manage marketing programs that are provided within the web site. In one embodiment, marketing programs or special offers are provided exclusively over the web site or in accordance with the teachings herein. Also in an alternative embodiment, web site access and participation are restricted to registered users, and use of the RFID tag is required. In an alternative embodiment, a publicly available internet web site is provided that does not require registration for users to participate. Moreover, in an alternative embodiment, a small fee may be charged to vendors and/or users who desire access to particular areas of the web site or to engage in various activities thereon. Preferably, the ability to define various programs or to be alerted of various programs are provided via SMS, e-mail or other media. Event management and analyses also are tailored to users, including business owners and marketers, and preferably do not require a high level of technical knowledge or skills. Moreover, the experience is designed to be seamless for the event manager as well as the users.

As noted above, the present invention supports a plurality of marketing applications, for example, for promoting the sale and support of goods and services by participating vendors. In one aspect, branding of goods and services is provided on the surface of the sticker or other medium that carries the RFID Tag. The sticker is preferably provided in many shapes and styles, and are customized, for example, to be printed in full color. In one embodiment, the RFID Tag is defined with a "shelf life" of a period of time, such as within a range of six months to one year, after which the RFID Tag is disabled automatically. In case an RFID Tag expires after the end of its shelf life, the user is preferably notified, for example, by e-mail or SMS, that the RFID Tag has expired and the user must either replace the RFID Tag or re-activate it. In an alternative embodiment, as long as a user's RFID Tag is read by an RFID Reader regularly, such as at least once a week, the RFID Tag shelf life is automatically renewed and does not expire. In this way, frequency tracking is preferably supported.

In one embodiment, customer loyalty programs are preferably supported, such as providing a free good or service after the user purchases ten goods or services. Alternatively, a user who pays a cover charge to gain access to a participating vendor's establishment (e.g., a tavern) is awarded one free entrance after paying for ten entrances. Since data provided to the information server are easy to collect and transmit, marketing and networking programs are relatively easy to implement and support. Further, communicating with participating users via SMS, e-mail or the like is convenient and can be automated. Moreover, by tracking participating users' activity via the RFID Tag provides a strong indicator of customer interest. So-called "viral" marketing applications, as known in the art, are well supported, thereby providing a convenient way to reach existing customers easily and directly. Moreover, data mining enables participating to accurately determine places and products in which customers have shown active and regular interest, A process in accordance with a preferred embodiment is now described. A user places a device that has an RFID Tag attached thereto sufficiently close to an RFID Reader so that the RFID Reader can wirelessly retrieve the unique identifier of the RFID Tag. The RFID Reader, thereafter, transmits information, including, for example, the unique identifier, timestamp and SIM identifier of the RFID Reader to an information processor, and the information is preferably stored in a database. The database preferably includes other information, such as a user's personally identifiable information and the RFID Reader's location, and the other information is preferably correlated with the respective unique identifier number and the SIM identifier. The database is preferably accessible by a secured internet web site such that marketing, data collection and social interaction are supported. Moreover, in a preferred embodiment, the database is updated, substantially in real time.

Referring now to the drawings in which like reference numerals refer to like elements, FIG. 1 illustrates an example hardware and end-user layout associated with a preferred embodiment. As shown in FIG. 1, an end-user 2 is provided with an RFID Tag 102 that is preferably coupled to a personal device 103, such as a cellular telephone. The end-user preferably uses the RFID Tag 102 at the premise of a respective vendor 104. Thereafter, information is transmitted to a plurality of devices and processes 106 (shown as THEZOMBI MACHINE). Thereafter, the information is transmitted to database 108 and, thereafter to a representation of the vendor, vendor avatar 110 and user 112.

Figure 2:
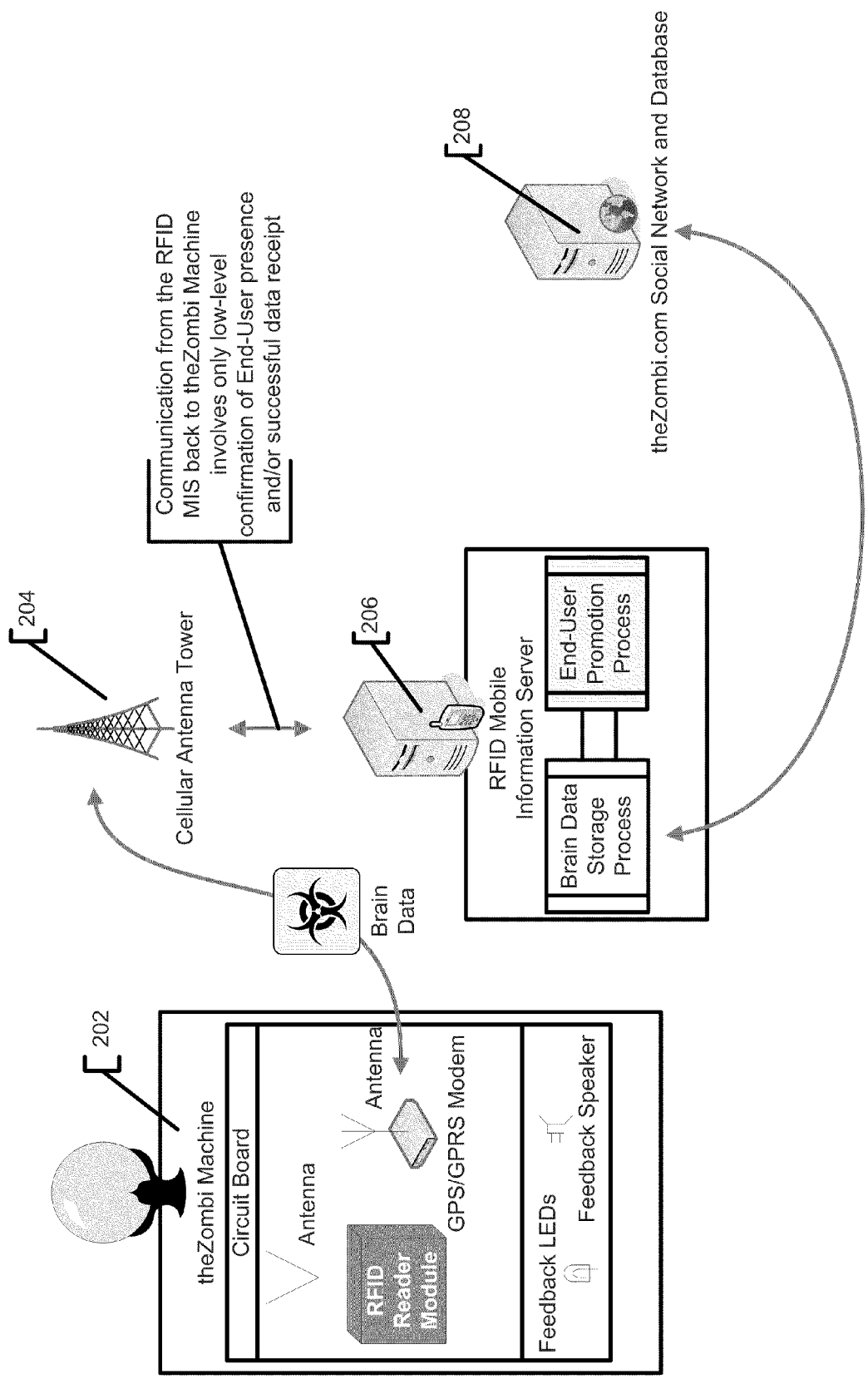
FIG. 2 illustrates an example hardware configuration for receiving and processing information in connection with an RFID tag.

FIG. 2 illustrates an example hardware configuration for receiving and processing information in connection with an RFID Tag 102. RFID Reader 202 preferably includes an antenna, as well as a communications device, such as a GPS/GPRS modem for receiving and transmitting information over a communication network. Further, RFID Reader 202 includes feedback LEDs and/or a feedback speaker that enable a user to determine whether or not successful transmission or reception of data has occurred.

Once data are received by RFID Reader 202, the data are preferably transmitted via cellular antenna tower 204 and thereafter to RFID mobile information server 206. Information server 206 preferably executes software modules that include storing data and providing a user interface, for example, for the end-user 2 promotion processes. Information is further transmitted to and from one or more databases provided on information processor 208 that may be provided on an additional information processor thereby implementing the social network of the present invention.

Figure 3:
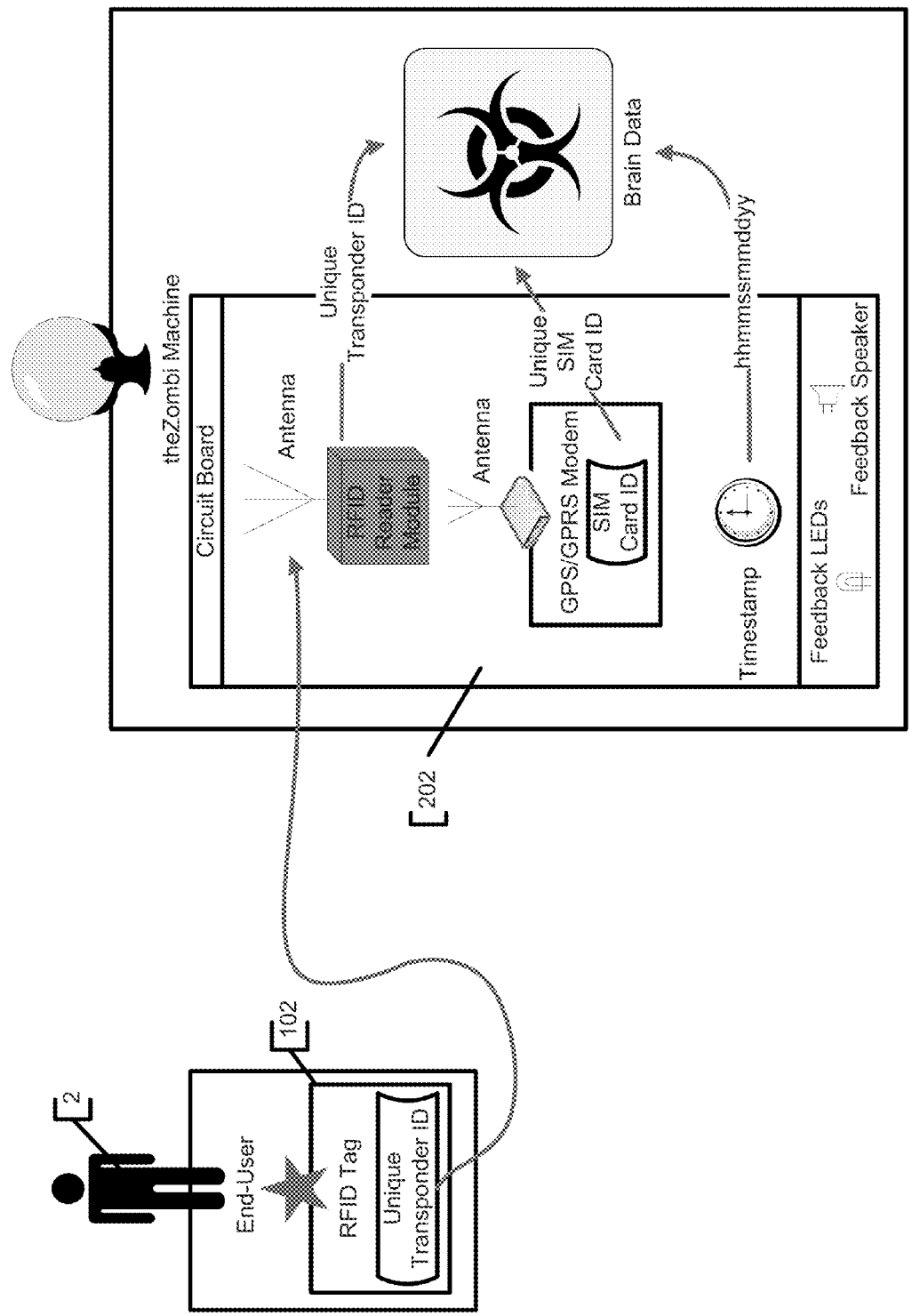
FIG. 3 illustrates an example hardware layout in accordance with the information collection processes.

FIG. 3 illustrates an example hardware layout in accordance with the information collection processes. As shown in FIG. 3, an end-user 2 operating a personal device 103 that has a RFID Tag 102 adhered thereto, carries the device with him. As noted above, the RFID Tag 102 preferably includes a unique identifier (shown as unique transponder ID). The unique identifier is preferably transmitted to RFID Reader 202 via an antenna. Preferably, a time stamp such as a time of day formatted as hours, minutes, seconds, month, day and year is included with the unique transponder ID data and transmitted to information processor 206.

Figure 4:
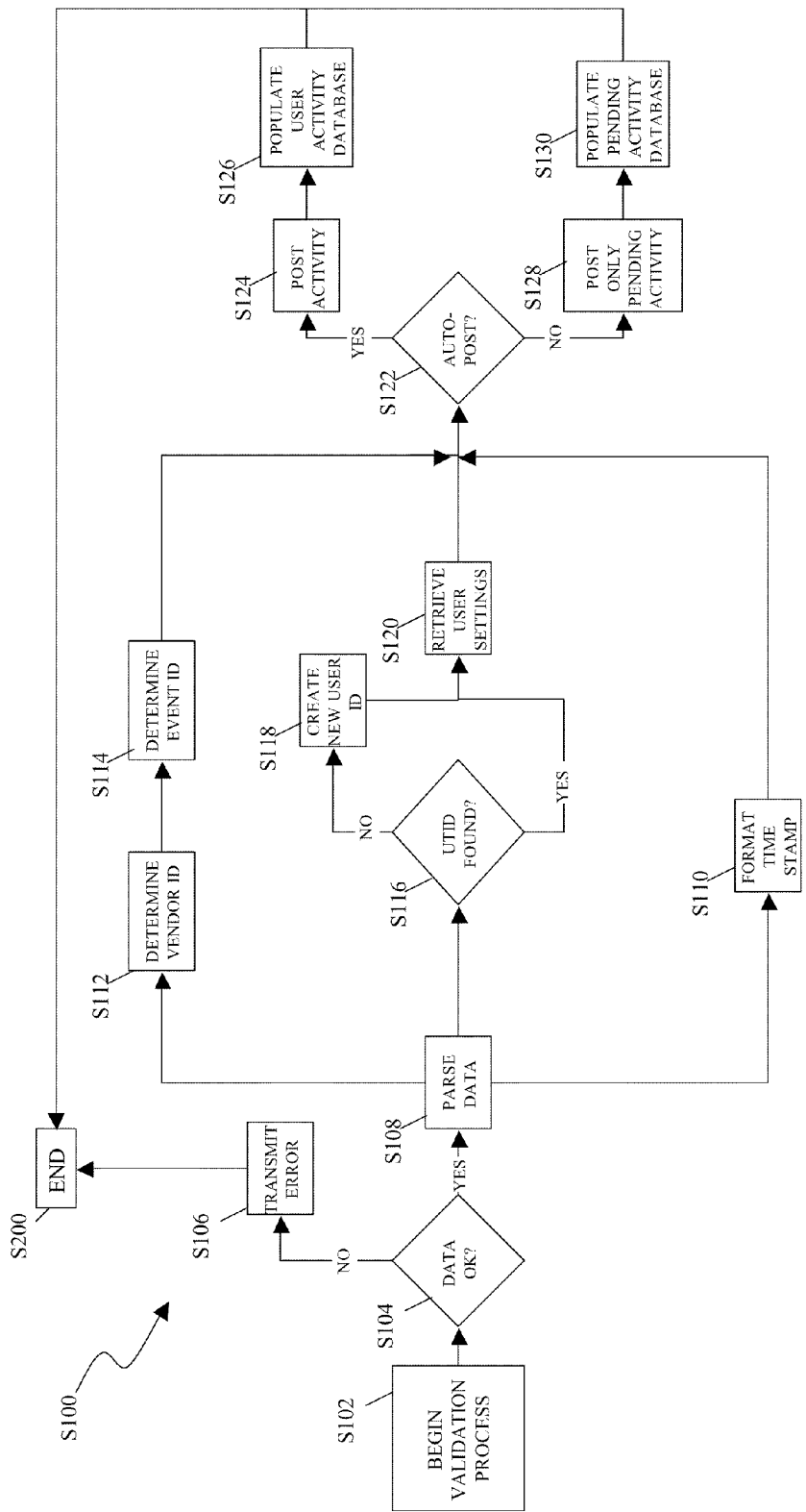
FIG. 4 is an example flowchart that shows steps associated with storing information received from an RFID tag via an RFID reader.

FIG. 4 is an example flowchart that shows steps S100 associated with storing information received from the RFID Tag 102 via RFID Reader 202. As shown in FIG. 4, the signal received from an RFID Tag 102 is validated (S102) and a determination is made whether the data transmission is successful (S104). In case a problem with the transmission occurs, an error signal is preferably formulated and transmitted (S106), and the process ends (S200). In case the signal is successful, then the information received from the RFID Reader 202 is acted upon, such as parsed into respective components (step S108). Once the data are acted upon, then a time stamp is preferably formatted (step S110) and transmitted for storage in a database accessible to information processor 208. Moreover, a vendor ID value representing a respective vendor 104 used by the user is determined (step S112) and selected, for example, via a SIM card ID. Thereafter, a respective event ID representing an event that is preferably defined by a respective vendor 104 is determined (step S114) and transmitted for storage in a database. Moreover, after the information received from the RFID Reader 202 is parsed or otherwise acted upon, an existing unique identifier (described as "UTID" or a unique transponder ID) is determined to be either found or not found (step S116). If not found, a new user ID is preferably created (step S118). If found (or if a new user ID is created), then the respective user ID associated with a unique identifier is preferably selected, for example, via information processor 206, and users' personal authorization and/or privacy settings are referenced in order to determine a user's personal settings (step S120).

Continuing with reference to FIG. 4, a determination is made whether, depending upon the user's respective personal settings, information is to be posted automatically to an internet web site or not (step S122). If so, then the web site is preferably updated (step S124) and the user's information including a time stamp, user ID and/or event ID is preferably stored on information processor 208 as active data (step S126). Alternatively, if the user has elected that information will not be automatically posted, then pending activity information is preferably posted (step S128) and is stored in the database associated with information processor 208 as pending data (step S130). Thereafter, the process ends (S200).

Figure 5:
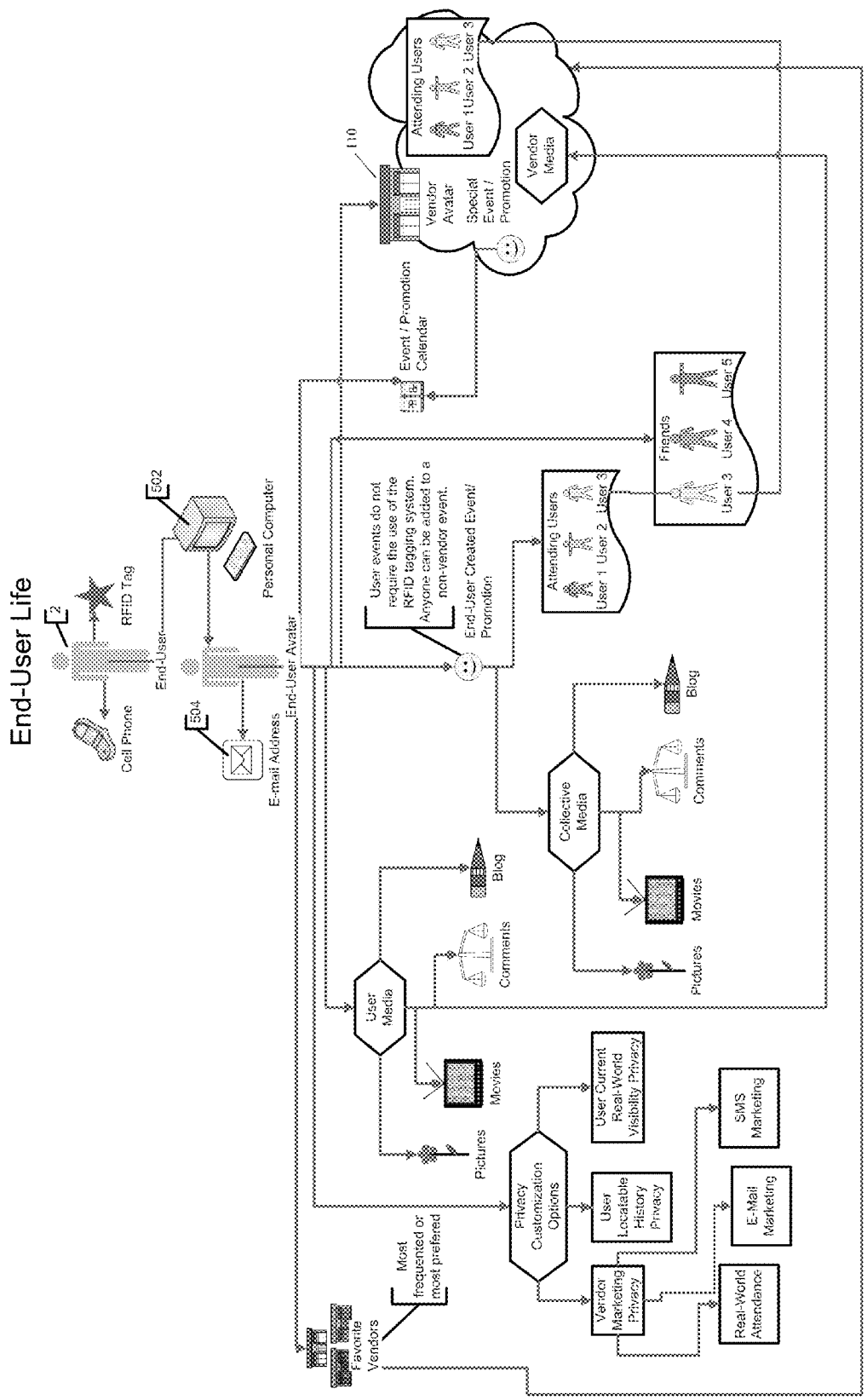
FIG. 5 illustrates an example overview of end-users in accordance with a preferred embodiment.

FIG. 5 illustrates an example overview 500 of end-users 2 in accordance with a preferred embodiment. As shown in FIG. 5, end-user 2 carries cellular telephone 103 that has RFID Tag 102 coupled thereto. The end-user 2 preferably uses a personal computer to communicate, for example, using the end-user's 2 e-mail address 504. Once connected, for example, to the internet, the end-user participates in an on-line social network that supports communication with friends, review and interact in collective media, such as pictures, movies, comments and/or blogs, define particular media, such as, pictures, movies, comments and/or blogs. The end-user 2 preferably also defines privacy or other customizable controls, such as whether or not to receive vendor marketing information, to allow publication of a user's whereabouts or location, as well as to enable a user's history of whereabouts or locations to be published and/or stored. Example vendor marketing privacy selections include whether or not to enable the user's real world attendance to be stored and/or posted on the internet, e-mail marketing communications and/or SMS marketing communications. Further, the user can interact to define or select events or promotions in a calendar application, as well as to select or define favorite vendors 104 and/or vendor media.

Thus, as shown in FIG. 5, an end-user 2 interacts via a plurality of hardware and software modules and applications in a supported social network environment. The user interacts with friends, identifies places where he has been, as well as items or services that he has procured.

Figure 6:
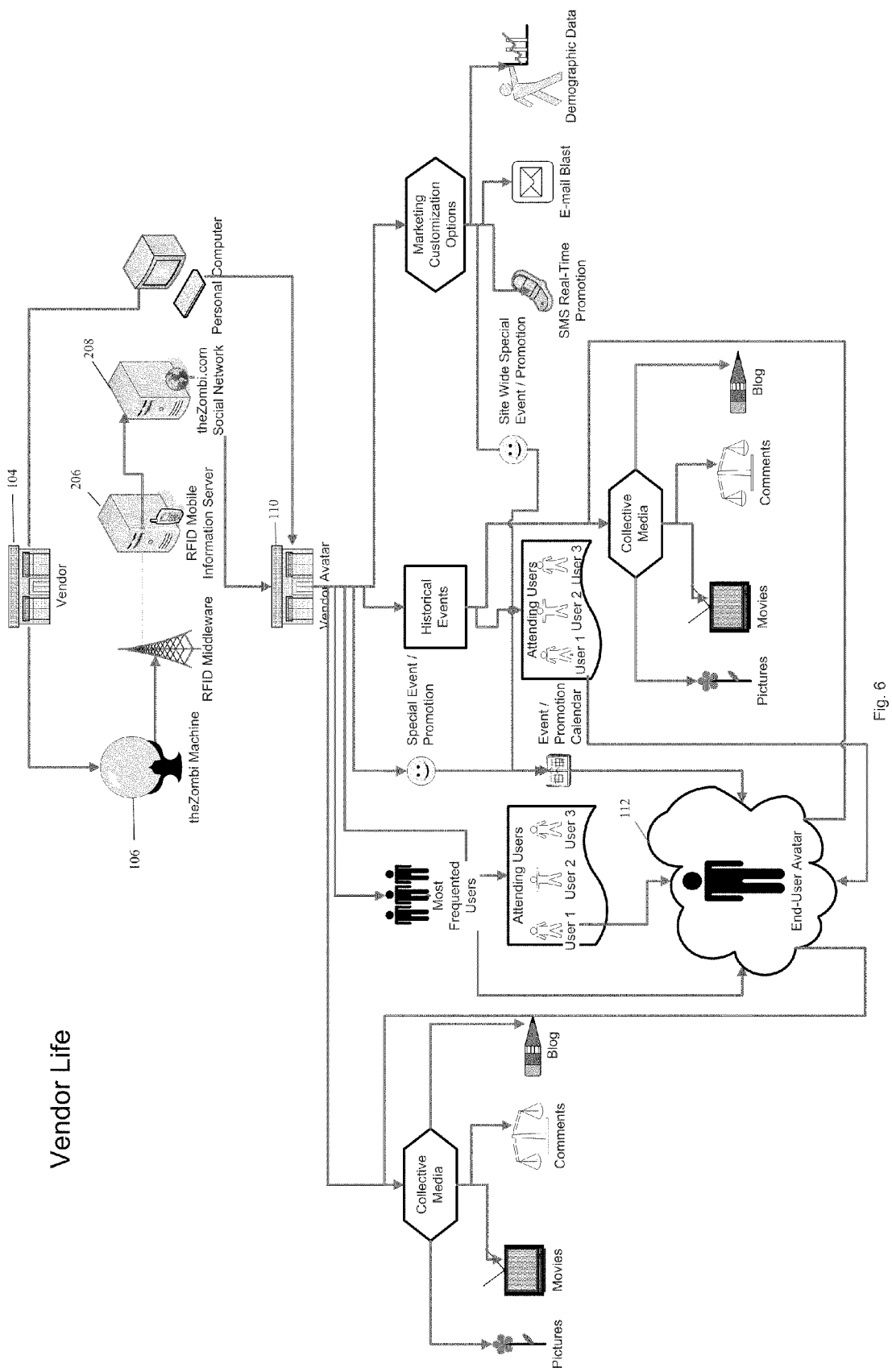
FIG. 6 shows an example layout in accordance with a vendor's perspective and hardware arrangement in accordance with a preferred embodiment.

FIG. 6 shows an example layout 600 in accordance with a vendor's perspective and hardware arrangement in accordance with a preferred embodiment. Vendors 104 preferably maintain RFID Readers 202 (shown as devices and processes 106, FIG. 6) and transmit information received thereby, for example, over the internet to be used in accordance with the teachings herein. As shown in FIG. 6, a virtual representation of a vendor, vendor avatar 110, is provided that receives and sends information directed to collective media, such as pictures, movies, comments and/or blogs. Further, information directed to users who most frequently patronize a vendor's site may be provided as well as those users who are currently attending or present at a vendor's location. Further, special events or promotions are preferably provided, such as, in a calendar type software application and a history of events including, collective media, such as pictures, movies, comments and/or blogs, as well as users who attended previously held events are preferably provided by vendors 104. Moreover, marketing customization options are preferably defined by vendors, such as site wide special events or promotions, SMS real time promotions, e-mail message campaigns and/or providing or receiving demographic information representing participating users who frequented or otherwise patronized a vendor's premise.

In another embodiment, a method is defined to bridge the gap between any end-user's 2 participation and a marketer or provider of a venue, application or video game, and who desires to leverage information received as a result of the end-user's 2 participation to display custom content. The end-user's 2 participation may also operate to unlock secured content, and/or to receive a customized end-user's experience without undue and laborious intervention on the end-user's 2 part. Preferably, the user's participation that enables the unlocking of the content represents conditions that are tied to real-world events. This content can be displayed in the real world via video screens or jukeboxes, or may be virtually presented, such as in-game advertisements and/or online content. This is preferably provided via an application program interface ("API") that enables connectivity with or to the database. Further, one or more computing devices provide hooks, and one or more APIs are available for, for example, access to the data to be available to 3rd party partners.

Figure 7:
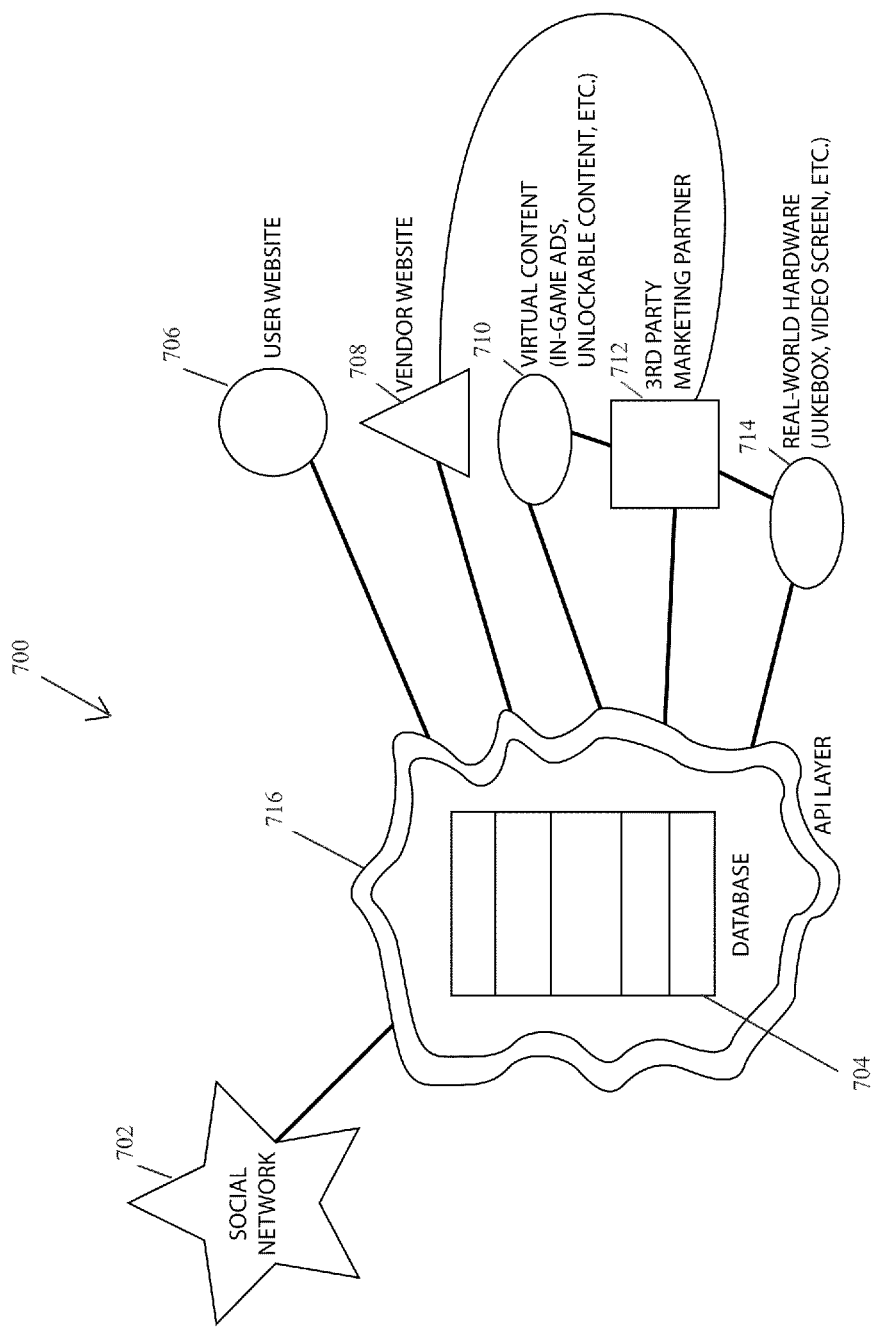
FIG. 7 shows an example arrangement of entities in accordance with an embodiment in which communication is effected as a function of a database application programming interface layer.

FIG. 7 shows an example layout 700 of different entities connecting to the main database through an API layer. As shown in FIG. 7, social network 702 interfaces with database 704. Moreover, user website 706, vendor website 708, virtual content 710, 3D party marketing partner 712 and hardware devices (e.g., jukebox, video screen, etc.) 714 each interface with database 704 via API layer 716. Preferably, a user submits authentication, such as a valid user name and password, to access database 604 via API layer 716, and is afforded access to different kinds and levels of information that are respectively available to particular entities depending upon the particular authentication provided.

Other features and advantages are now described with reference to examples.

In one example, a vendor 104 desires to advertise on a social network provided in connection with the teachings herein. The vendor 104 places an RFID Reader 202 in the vendor's venue, and the user information received from the Receiver 202 provides the vendor with an ability to post events and promotions at no additional cost to the end-user 2, or, alternatively, to manage experiential content and to control offline SMS promotions. Therefore, simply by end-users 2 visiting the vendor's venue and receiving the end-user's 2 unique identifier, the vendor 104 is able to collect demographic data of existing customers and to communicate with the end-users 2 directly or indirectly (e.g., globally) for a promotion. As noted herein, end-users 2 may define privacy settings that prevent or otherwise preclude vendors 104 from communicating with end-users 2 directly or indirectly for a promotion. In any event, the nature of the devices being in many locations enables the vendor 104 to run a banner-ad advertising campaign with the social network, at least partially due to an accurate data-set to target the vendor's existing and potential customers. Moreover, accurate and useful offline promotions and the ability to attract end-users 2 to the vendor's real-world venue in conjunction with the present invention improves the accuracy and broadens the vendor's segmentation becomes without relying exclusively on the social network to provide me with potentially bogus or fuzzy segmentations.

In another example, a vendor 104 has a booth at a trade show, and desires to collect contact information from visitors to the booth. The vendor 104 has an RFID Reader 202 sitting at the vendor's booth, as well as RFID Tags 102 for visitors to take and that are compatible with the vendor's 104 RFID Reader 202. When a potential client or person is interested in what the vendor's goods/services, the person brings his RFID Tag 102 in close proximity to the RFID Reader 202. Preferably, the RFID Tag 102 is provided by the vendor and includes personalized marketing message(s) printed thereon. The vendor 104 is provided with contact information after the database has correlated the unique identifier with the person, and communication is available at a later point.

In yet another example, a vendor 104 desires to provide relevant information to end-users 2. Participating end-users 2 that use RFID Tags 102 preferably communicate with information processors 206 and 208 in order to control over how they want vendors and other end-users 2 to communicate with them. For example, an end-user 2 may prefer e-mail, SMS messages, or may elect not to receive any unsolicited communication. This saves the vendor 104 an immense amount of time to determine the best way to reach users and lets the vendor invest as much time as necessary for delivering the right message to the right end-users 2. Additionally, data are preferably formatted uniformly and contain extra "real-world" data that is not merely hearsay. The vendor 104 has a distinct advantage over competitors in that marketing campaigns are tailored to appeal to specific end-user's senses, as well as to divert their attention towards the vendor's product or service. Moreover, the vendor customizes messaging in new ways because the vendor is informed of end-users 2 much more than is available in typical, prior art market research. For example, the vendor 104 may be informed of end-users' 2 birthdays, favorite locations, and travel, places end-users 2 shop, and the types of people whom the end-users 2 associate. Further, the vendor's banner-advertisements are also made more relevant to end-users 2 because the vendor already knows that end-users 2 are either already interested in what the vendor is offering, or are visiting a competitor with similar offerings. All of this information is available from a single source and is easy to interpret and use.

In still another prior art example, a vendor 104 wants to communicate to end-users 2 during a point of sale. In addition to signs or messages that are attached to an RFID Reader 202, when an end-user 2 swipes his or her RFID Tag 102 and has SMS communication enabled via their privacy settings online, the vendor communicates instantly with the end-user 2 at the point of sale. The communication is formatted with promotions, sweepstakes, marketing messaging or the like, or is a basis for SMS-based entertainment, such as the like the "lucky seat" promotion, (described above), but not limited to a pre-defined set of rules.

Another prior art example regards end-user 2 communication, such that end-users desire to know communicate with friends. All of the end-user's 2 friends use RFID Tags 102 and have allowed the end-users 2, via their respective privacy settings, to see where they at any given moment via the social network, so long as the location where they are has and RFID Reader 202 installed and the friends have used it. If so, the end-user 2 can very quickly determine where people are, what they are doing and where they have been. Additionally, so long as the users have enabled the option, whenever end-users 2 provide RFID Tags 102 to a RFID Reader 202 in a respective venue, a SMS or Instant Message is instantly transmitted.

In yet another prior art example, an end-user 2 desires to locate people having similar interests. Since an end-user's 2 real-world history is documented on the social network, the end-user can find venues that the end-user likes to attend and see who else has attended. From there, the end-user 2 can look at another individual end-user's profile on the social network and determine if he or she has similar interests with a great amount of confidence that their inferred interests are accurate and legitimate.

In yet another prior example, an end-user wants to publish to his friends that he just attended a great show. In case the location of the show has an RFID Reader 202 and the end-user uses his RFID Tag 102 therewith, the end-user's personal page on the social network is immediately updated to show that the user attended the show, thereby providing proof that the end-user was there.

In yet another prior example, an end-user wants to locate a person the end-user met at a social gathering, such as at a tavern. The tavern is equipped with an RFID Reader 202, and the end-user can view the pseudo-end-user representation of the tavern on the internet web site provided by information processor 208, and can further review past events. In case the person that the end-user seeks to find is also an end-user and has his/her privacy settings set to an appropriate level, the end-user can find the profile and then contact that person. Preferably, a RSS feed represents user activity and enables members to track each other's locations at given times. RSS is useful, for example, to populate an end-user's personal blog or web site, or subscribe to a friend's RSS feed to monitor all of that friend's activity, pursuant to respective privacy policy. RSS is also available as a conduit for passing end-user data to $3^{rd}$ party applications, including, for example, video games. In yet another alternative example, an end-user wants to hear and see other people's experiences at a particular venue where the end-user attended. The venue is equipped with an RFID Reader 202, and venue's personal page maintains content submitted by end-users, such as pictures, videos, comments and blogs. Since only end-users that attended and swiped in with their RFID Tag 102 can post this content for this event, even though others can review it, the end-user is assured that the content is authentic and meaningful. The pseudo-end-user owner of the venue may also post and edit content of their particular venue. This alternative embodiment is suitable, for example, for a vendor 104 or other provider of Reader 202. For example, the NATIONAL HOCKEY ASSOCIATION incorporates a website and supports a social network that allows for various functionality shown and described herein.

In yet another alternative example, an end-user creates a "mash-up" of data combined with particular user-provided parameter. For example, an internet web site provides a combination of features directed to apartment listings for rent and purchase, with directed to graphic mapping functionality. In a preferred embodiment, the end-user uses APIs 716 and/or publicly accessible API's to access anonymous data from the database, provided the user have applied for a developer key, which carries no user-identifiable information. Some information that is collected by Reader 202 is used, for example, in data extraction and analysis purposes. For example, population trends, purchasing trends, trends of users responding to advertisements or promotions are provided from data received from Reader 202. Although data received by Reader 202 is preferably (although not required to be) subject to privacy controls, information derived therefrom, such as trend-related information, that does not reveal private or otherwise sensitive information related to a particular user. In one embodiment, the extracted data is accessible in the mash-up. Thus, as shown and described herein, a new, accessible and current on-line social network is defined and supported that includes at least one external hardware component for data reception and transmission. By employing devices, an accurate, up-to-the-minute information secure network hub is provided that is customizable to support a vast and complex personal and commercial needs. The systems and methods provided herein bridges a gap between virtual social networks, which have gained popularity and traction on the internet, and with other virtual worlds or internet-connected devices, with other real-world and inter-personal relationships and activities experienced by people "off-line." Moreover, it is envisioned that the systems and methods disclosed herein operate as tools to support personal, professional and commercial relationships, and not exclusively as a substitute therefor. The systems and methods disclosed herein support and are operable with existing commercial marketing vehicles in which users may have previously invested.

Accordingly, the systems and methods are applicable for vendors and end-users alike. Any organization that is interested in quickly and easily reaching a target audience can benefit from the teachings herein, including, for example, local/national retailers, entertainment venues (e.g., bars, clubs or the like), public spaces (e.g., museums, parks or the like) and other publicly accessible venues, such as venues for conventions, conferences and trade shows, where professional and personal communities gather. Using the systems and methods disclosed herein, vendors can access users at preferred times, such as when a user enters an establishment or at the point of sale. Further, direct communication can be established with users during times even long after a user has frequented an establishment or venue. Moreover, accurate, dynamic and rich demographic data are provided for vendors that enables new direct-to-consumer marketing opportunities that are not available in the prior art. The systems and methods defined herein provide vendors with new customizable, automated and current marketing opportunities that are directed to consumers who have already demonstrated an interest or affinity towards the vendor's goods or services. Vendors can also engage in improved data mining of targeted consumers, provide point of sale promotions substantially in real-time, and engage in interactive marketing initiatives. The systems and methods described herein provide power insights, and enable vendors to determine patterns and conclusions that were not otherwise able to be made. For example, all visitors to a particular venue at a particular time, share a particular interest. Users can also use remote communication devices, e.g., cellular telephones and PDA's to provide instant feedback to vendors, enabling vendors to enjoy benefits associated with instant permission based marketing.

Further, individual users, such as promotion-seeking consumers, or socially conscious individuals who have access to cellular or other communications devices and who engage in real-world (i.e., not virtual) social activities. At least partially due to the architecture associated with the teachings herein, minimal effort on the part of users is required. Further, users enjoy additions (or alternatives) to existing on-line social networks, as new forms of entertainment are supported in connection with real-world applications. Users can validate social status and enjoy mobility or promotions in social status as a function of the teachings herein by confirming or otherwise verifying non-virtual human action and interaction. Moreover, users enjoy an extremely low-barrier of entry for opt-in marketing including, for example, e-mail collection, customer loyalty programs, promotions or the like.

One way that users are able to enjoy benefits associated with the teachings herein is via a unique identifier defined for each user that is referenced each time RFID Tag 102 is read by RFID Reader 202. Thereafter, the user maintains or otherwise upgrades his position in the dynamic, on-line social network that is effectively based upon real world social (personal and professional) activity. As noted above, the user is entitled, thereafter, to exclusive offers and promotions, and can enjoy real-world self-promotion as a function of real-world social history. Other advantages provided to a user include locating friends substantially in real-time, and maintain real-world social histories with hubs for socially and professionally significant events at one or more vendors' locations. Further, privacy controls are provided that preclude access to a particular user's history from other users or vendors.

In alternative embodiments, users can enjoy other benefits as a function of the systems and methods provided herein. For example, a user can define a list of preferred songs, i.e., a playlist, that is submitted on an internet web site or other remotely accessible database, and when the user enters a vendor's establishment, a song defined in the playlist is added automatically to a jukebox queue. Other benefits include defining an automatic alert that alerts other users as to a particular user's location or whereabouts. Further, a user can participate in SMS-based social games, receive special promotions and schedules from one or more vendor establishments, while the user is "on-location." Further, vendors may decide to award customer loyalty rewards for users who frequent a particular establishment using RFID tag 102.

Although the present invention has been described in relation to particular embodiments thereof, many other variations and modifications and other uses will become apparent to those skilled in the art. It is preferred, therefore, that the present invention be limited not by the specific disclosure herein.

What is claimed is:

1. A system for verifying presence at a vendor location, the method comprising:

an identification tag coupled to a device, wherein the identification tag is operable to transmit a unique user identifier representing a user in possession of the device;

an identification tag reader operable to receive from the identification tag the user identifier, wherein the identification tag reader is placed at a location of a vendor;

a computing device, operable to receive the user identifier from the identification tag reader, and further operable to receive from the identification tag reader a vendor identifier representing the vendor location, and still further operable to receive a time identifier representing a time when the identification tag reader received the user identifier from the identification tag; and a database that stores the user identifier, the vendor identifier and the time identifiers with a plurality of other user identifiers, other vendor identifiers and other time identifiers, wherein the computing device determines the name of the user and the name of the vendor as a function of the user identifier and the vendor identifier.

2. The system of claim 1, further comprising a promotion that is provided to the user from the vendor as a function of the identification tag reader receiving the user identifier.

3. The system of claim 2, wherein the promotion includes an advertisement transmitted to the device.

4. The system of claim 2, wherein the promotion includes a price discount on a good or service provided by the vendor.

5. The system of claim 1, wherein a vendor avatar representing the vendor is displayed on an internet web site or a user avatar representing the user is displayed on the internet web site.

6. The system of claim 1, further comprising an advertisement campaign that is transmitted to a plurality of users as a function of user identifiers and time identifiers.

7. The system of claim 1, wherein the identification tag includes a low frequency RFID device.

8. The system of claim 1, wherein the user provides an alias name.

9. The system of claim 8, wherein the computing device posts at least one of the name of the user or the alias name, the name of the vendor and the time identifier on an internet web site.

10. The system of claim 9, wherein the computing device provides access to at least one of the name of the user or the alias name, the name of the vendor, and the time identifier to visitors of the internet web site pursuant to privacy settings defined by the user.

11. A method for verifying presence at a vendor establishment, the method comprising:

coupling an identification tag to a device, wherein the identification tag is operable to transmit a unique user identifier representing a user in possession of the device;

placing an identification tag reader at the vendor establishment;

receiving by the identification tag reader the user identifier from the identification tag;

receiving by a computing device the user identifier, a vendor identifier representing the vendor establishment and a time identifier representing a time when the identification tag reader received the user identifier from the identification tag from the identification tag reader;

storing in a database the user identifier, the vendor identifier and the time identifiers with a plurality of other user identifiers, other vendor identifiers and other time identifiers; and determining by the computing device the name of the user and the name of the vendor as a function of the user identifier and the vendor identifier.

12. The method of claim 11, further comprising content to the user from the vendor as a function of the identification tag reader receiving the user identifier.

13. The method of claim 12, wherein the content includes a promotion or an advertisement transmitted to the device.

14. The method of claim 12, wherein the promotion includes a price discount on a good or service offered to the user and provided by the vendor.

15. The method of claim 11, further comprising providing by the user an alias name.

16. The method of claim 15, further comprising posting the name of the user or the alias name, the name of the vendor and the time identifier on an internet web site for a plurality of visitors of the web site to view pursuant to privacy settings defined by the user.

17. The method of claim 11, further comprising transmitting an advertisement provided by the vendor to a plurality of users as a function of at least one of user identifiers, vendor identifiers and time identifiers.

18. The method of claim 11, selecting by the vendor a vendor avatar representing the vendor or selecting by the user a user avatar representing the user.

19. A method for verifying a person's presence at a particular location, the method comprising:

storing in a database user information of people, wherein each of the people has a respective identification tag;

receiving, by a tag reader, data from one of the respective identification tags;

transmitting the data from the tag reader to a computing device;

determining from the data an event ID representing an event where the tag reader received the data;

determining from the data a user ID representing a user of the one respective identification tag, and assigning a new user ID in case the user ID cannot be determined from the data;

determining from the data a time stamp when the tag reader received the data;

matching the user ID with information in the database; and storing the event ID, the user ID and the time stamp to be published on an internet web site in case the matched data indicates that the user associated with the user ID has authorized the publishing.

20. The method of claim 19, wherein the publishing promotes a virtual social network that is based upon real-world social interaction.

21. The method of claim 19, further comprising an application program interfaces enabling access to the matched data.

* * * * *